United States Patent [19]

Mercer

[11] Patent Number: 5,698,981
[45] Date of Patent: Dec. 16, 1997

[54] TECHNIQUE FOR ESTABLISHING AT LEAST A PORTION OF AN UNDERGROUND PATH OF A BORING TOOL

[75] Inventor: John E. Mercer, Kent, Wash.

[73] Assignee: Digital Control Incorporated, Renton, Wash.

[21] Appl. No.: 615,467

[22] Filed: Mar. 14, 1996

[51] Int. Cl.[6] ................................................ G01V 3/11
[52] U.S. Cl. ................................................ 324/329
[58] Field of Search ...................... 324/326, 345, 324/346, 207.22, 207.26, 67, 329, 328, 327, 66; 33/304; 73/151; 340/853.4, 853.5; 175/45

[56] References Cited

U.S. PATENT DOCUMENTS

| | | | |
|---|---|---|---|
| 4,806,869 | 2/1989 | Chau et al. | 324/326 |
| 4,972,703 | 11/1990 | Ho | 73/151 |
| 5,155,442 | 10/1992 | Mercer . | |
| 5,337,002 | 8/1994 | Mercer . | |
| 5,444,382 | 8/1995 | Mercer . | |
| 5,585,726 | 12/1996 | Chau | 324/326 |

*Primary Examiner*—Sandra L. O'Shea
*Assistant Examiner*—Roger Phillips
*Attorney, Agent, or Firm*—Stephen C. Shear

[57] ABSTRACT

A method of establishing the location of at least a portion of a particular path taken by a boring tool within a given region is presented. The method includes the steps of establishing a reference path within the region and providing a portable locator and means located partially at and forming part of the boring tool and partially at and forming part of the locator for generating certain information about the position of the boring tool relative to the position of the locator. When the boring tool reaches various spaced apart measuring locations as it moves along the particular path, at each such measuring location, the locator is positioned on the reference path at an associated reference point which is specifically determined by the position of the boring tool at the associated location on the particular path. With the locator positioned at each of these reference points, positional information of the boring at the associated location on the particular path is generated and recorded and, from this recorded information, an actual path taken by the boring tool is established, which actual path corresponds generally to at least a portion of the particular path taken by the boring tool.

19 Claims, 3 Drawing Sheets

TECHNIQUE FOR ESTABLISHING AT LEAST A PORTION OF AN UNDERGROUND PATH OF A BORING TOOL

BACKGROUND OF THE INVENTION

The present invention relates generally to an underground boring technique, especially one which is intended to install underground utility cables, and more particularly to a specific technique for establishing the location of the underground path actually taken by such a boring tool and therefore the actual location of the utility cables installed in the ground by the boring tool.

Installing underground utility cable using a steerable boring tool is well known in the art. Various examples are described in continuing Mercer U.S. Pat. Nos. 5,155,442, 5,337,002 and 5,444,382 and pending U.S. application Ser. No. 442,481, filed May 16, 1995 which is a continuation of Mercer U.S. Pat. No. 5,444,382 (collectively referred to herein as the Mercer Patents), all of which are incorporated herein by reference. An example of the prior art Mercer technique is best illustrated in FIG. 1 herein which corresponds to FIG. 2 in the Mercer Patents. For purposes of clarity, the reference numerals used in the Mercer Patents have been retained herein for like components.

As seen in FIG. 1, an overall boring machine 24 is positioned within a starting pit 22 and includes a length of drill pipe 10, the front end of which is connected to the back end of a steerable boring head or tool 28. As described in the Mercer Patents, the boring tool includes a transmitter or sonde for emitting a dipole magnetic field 12 which radiates in front of, behind and around the boring tool, as illustrated in part in FIG. 2. A first operator 20 positioned at the starting pit 22 is responsible for operating the boring machine 24, that is, he or she causes the machine to let out the drill pipe, causing it to push the boring tool forward. At the same time, operator 20 is responsible for steering the boring tool through the ground. A second locator/monitor operator 26 is responsible for locating boring tool 28 using a locator or receiver 36. The boring tool is shown in FIG. 1 being guided around an obstacle 30 at a generally constant depth beneath a reference surface 32 until it reaches a termination pit 34. The locator/monitor operator 26 holds locator 36 and uses it to locate the surface position directly above tool head 28. Once operator 26 finds this position, the locator 36 is used to determine the depth tool heed 28. Using the particular locator of the present invention, operator 26 can also determine the orientation (yaw, pitch and roll) of tool head 28 and other information pertinent to the present invention, as will be described hereinafter. This information is passed on to operator 20 who uses it to steer the boring tool to its target.

As stated above, the overall arrangement illustrated in FIG. 1 may be used to install underground utility cable. After the boring tool reaches termination pit 34, the cable is connected to the drill pipe and pulled into position within the ground as the drill pipe is pulled back through the underground tunnel to starting pit 22. Once the utility cable is so installed, it would be quite desirable to have a record of where it is actually located within the ground. As will be seen hereinafter, the present invention fulfills this desire in an uncomplicated and reliable way using much of the technology described in the Mercer Patents.

SUMMARY OF THE INVENTION

As will be described in more detail hereinafter, an overall process in which a boring tool, for example boring tool 28, is moved through the ground within a given region along a particular path from a specific starting point is disclosed herein. A method of establishing the location of at least a portion of the particular path within the region is also disclosed herein. In accordance with this method, a reference path is established within the region and a portable locator is utilized along with means located partially at and forming part of the boring tool and partially at and forming part of the locator for generating certain information about the position of the boring tool relative to the position of the locator. When the boring tool reaches various spaced apart location (e.g., measuring locations) as it moves along the particular path, at each such measuring location the locator is positioned on the reference path at an associated reference point which is specifically determined by the position of the boring tool at the associated measuring location on the particular path. With the locator positioned at each of these reference points, the position information of the boring tool at the associated measuring location on the particular path is generated and recorded and, from this recorded information, an actual path containing the associated measuring locations is established. This actual path corresponds generally to at least a portion of the particular path taken by the boring tool. In a preferred embodiment, sufficient measuring locations and corresponding reference points are used to establish an actual path which closely approximates the actual path taken by the boring tool and, therefore, in the case where the boring tool is used to install underground utility cable, it corresponds closely to the location of the cable once the latter has been installed.

In a particular embodiment of the present invention, measurements of the actual distance the boring tool moves through the ground along the particular path are taken from its starting point to each spaced-apart measuring location and these measurements are used along with the recorded information discussed immediately above to establish the actual path. In this same particular embodiment, the means located partially at and forming part of the boring tool and partially at and forming part of the locator also generates information about the pitch of the boring tool and this information is also used along with the recorded information to establish the actual path. It is to be understood that the term actual path not only refers to the completed path put to portions of the path as it is actually established. Thus, as this path is formed it can be displayed in accordance with the present invention, as will be seen.

Still referring to the particular embodiment described immediately above, the means located partially at and forming part of the boring tool and partially at and forming part of the locator continuously generates the previously recited information about the position of the boring tool relative to the position of the locator as the boring tool moves along its particular path. However, the position information is recorded only when the boring tool is at the various spaced apart measuring locations. At these spaced apart locations, identical procedures are used in this particular embodiment to find the associated reference points on the reference path. According to the particular embodiment disclosed herein this particular procedure relies on the utilization of a specifically designed elongated electromagnetic radiation transmitter which is contained by the boring tool and which results in front and rear negative locate points that are described in the Mercer Patents and used in this procedure. For now it suffices to say that this procedure which is used to find the reference points on the reference path includes the steps of (a) first placing the locator in a fixed orientation at either the front or rear negative locate point when the boring tool is at each measuring location, and (b) thereafter moving the locator in a predetermined way from the selected locate point to the reference point.

Still referring to this particular embodiment, the means located partially at and forming part of the boring tool and partially at and forming part of the locator includes a pair of orthogonal antennae contained by the locator for detecting the electromagnetic radiation transmitted by the transmitter. The locator is first placed in the fixed orientation just mentioned at the front or rear negative locate point such that the orthogonal antennae face a particular direction and are in a particular horizontal plane. The particular way in which the locator is moved from each location to its associated reference point is to move it from the location to the reference point in a direction perpendicular to a line through the negative locate points of the boring tool while rotating the locator about a vertical axis such that when the locator reaches the particular reference point the orthogonal antennae are rotated 90° about the vertical axis but in the same horizontal plane.

BRIEF DESCRIPTION OF THE DRAWINGS

The particular embodiment of the present invention described briefly above and the present invention generally will be described in more detail hereinafter in conjunction with the drawings wherein.

DETAILED DESCRIPTION

Figure 3:
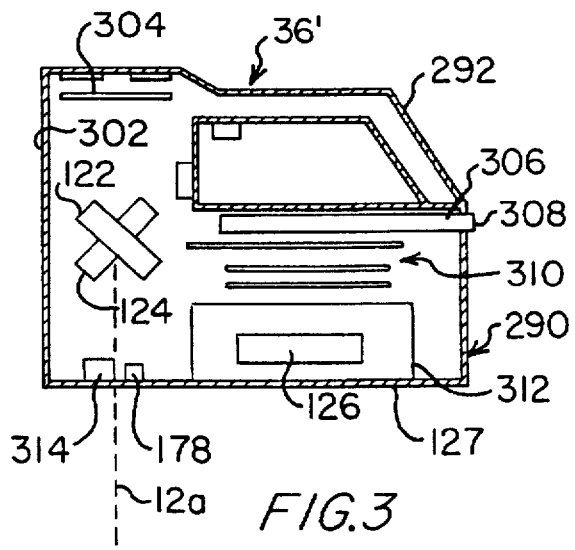
FIG. 3 is a side elevational view of a locator or receiver which may be used in the operation illustrated in FIG. 1 but which has been modified in accordance with the present invention.

Turning again to the drawings, attention is immediately directed to FIG. 3 which illustrates a locator 36'. With exceptions to be noted, locator 36' may be identical to locator 36 described in the Mercer Patents. Therefore, the same reference numerals used to describe locator 36 in the Mercer Patents have been used to designate corresponding components in locator 36'. In order to understand and appreciate the present invention, the only particular components of locator 36' that form part of locator 36 and that are important to note here are the antenna receiver arrangement comprised of orthogonal antennae 122 and 124 and associated processing circuitry for measuring and suitably processing the field intensity at each antenna and roll/pitch antenna 126 and associated processing circuitry for measuring the pitch and roll of the boring tool. Note specifically that when the base 127 is horizontal and in the plane of the paper, the orthogonal antennae 122 and 124 extend 45° from both the horizontal and vertical. With this in mind, there will be provided immediately below a brief description of the way in which locator 36' is used to locate boring tool 28.

Returning to FIG. 2, as previously mentioned, the boring tool 28 includes a transmitter which emits magnetic field pattern 12. For purposes of the present discussion, let it be assumed that the boring tool is located within the ground immediately below point P1 and is oriented horizontally in the plane of the paper so as to display zero pitch and zero yaw and thereby simplify the present example. Under these circumstances, the flux field from the pattern comes up through the ground with a vertical component within the plane of the boring tool at what may be referred to as a front locate point and a similar vertical flux component extends upward through the ground immediately behind and in the same plane as the boring tool through at what may be referred to as a rear locate point. These front and rear locate points are referred to as lateral locates in the Mercer Patents. They can be found by locator 36' in the manner described in the Mercer Patent and reference is made thereto. Briefly, however, operator 26 knows when the locator is directly above either the front locate point FLP or the rear locate point RLP because these are the only isolated two points in which the flux field from the magnetic field pattern bisects the antennae arrangement 122, 124 in the manner shown by a dotted line at 12a in FIG. 3. The operator can tell when this occurs because the field intensity detected by the two antennae will be equal at these two points and the change in relative antenna intensity with movement of the locator will be different than for the points immediately above the boring tool. Finding these locate points is important to the present method, as will be seen hereinafter. The fact that the two locate points lie in a plane through the axis of the boring tool is also important to the present method, as will also been seen.

Figure 2:
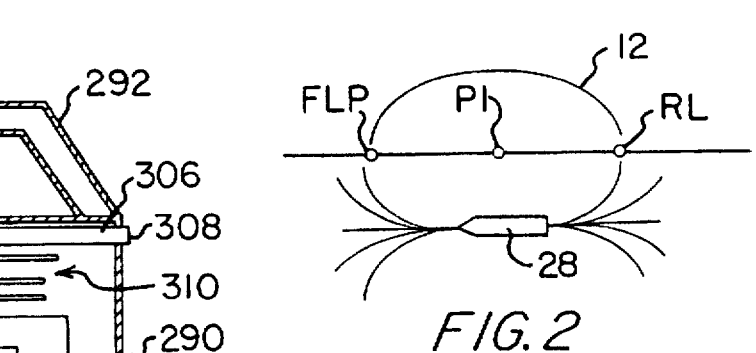
FIG. 2 is a diagrammatic illustration of a boring tool used in the operation shown in FIG. 1 and particularly depicts, in part, the electromagnetic radiation pattern emitted from the transmitter contained by the boring tool.
Figure 4:
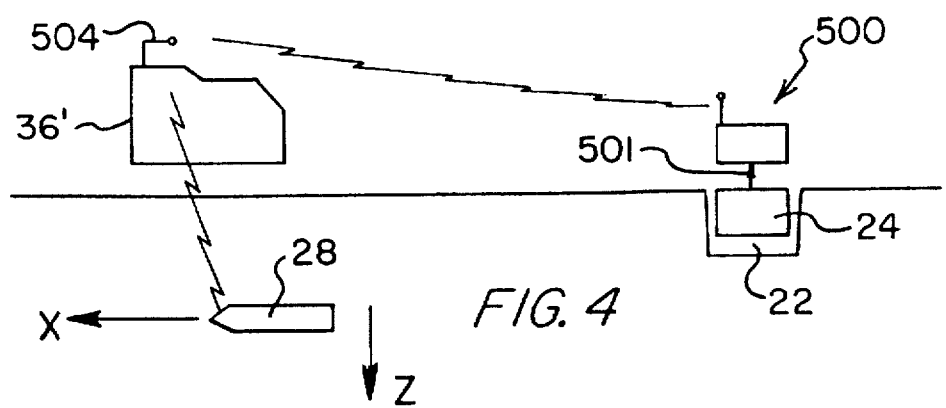
FIG. 4 diagrammatically illustrates the way in which the boring tool of FIG. 1 communicates with the locator of FIG. 3 and the way in which the locator communicates with a cooperating receiver forming part of a remote processing system at the starting pit, that is, at the starting point for the boring tool.

Referring to FIG. 4, the boring tool 28 is shown in the same horizontal position as FIG. 2 and immediately above the boring tool is locator 36'. A remote processing system generally designated by the reference numeral 500 is shown positioned at starting pit 22. The purpose of this FIG. 4 is to illustrate one main difference between locator 36' and locator 36. The latter is able to receive pitch and roll information from boring tool 28 by means of radio wave but there is no such communication between locator 36 and any receiving equipment at starting pit 22. In contrast thereto, locator 36' upon receiving the same information from the boring tool included readily providable means to be described in conjunction with FIG. 6 including a transmitting antenna 504 (see FIGS. 4 and 6) for relaying roll and pitch information to cooperating receiver hardware 500 as well as other positional information of the boring tool processed by locator 36'. All of this information, that is, the roll and pitch and other positional information is processed by system 500 in accordance with the present invention, as will be described hereinafter.

Figure 5:
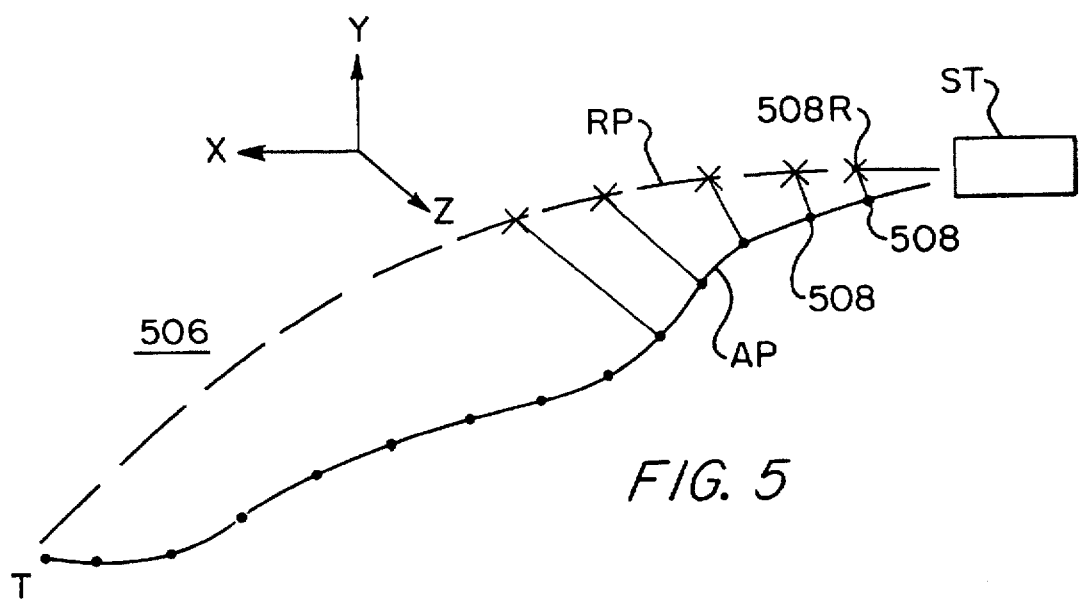
FIG. 5 diagrammatically illustrates the way in which the boring tool actually moves through the ground from its starting point to its terminating or target point along with a particular reference path between those two points.
Figure 7:
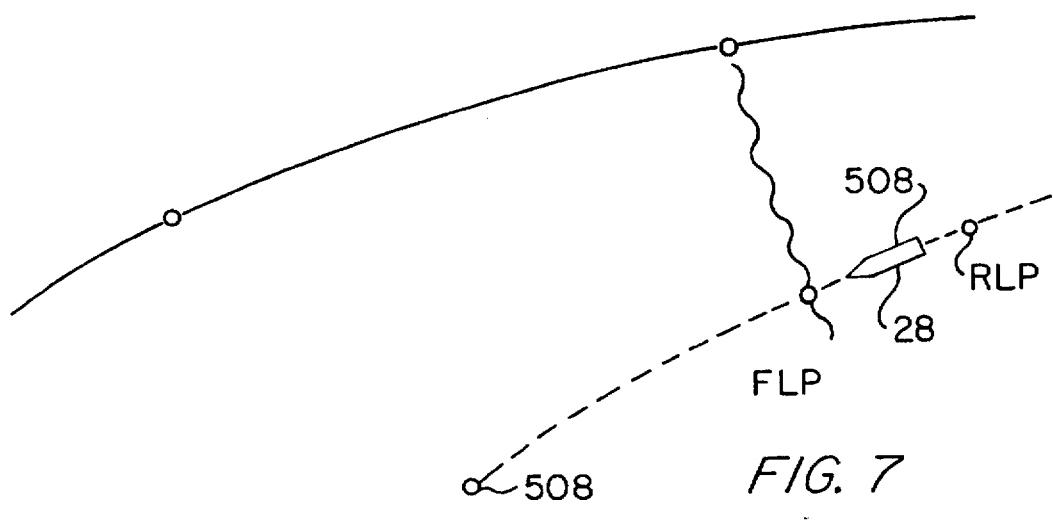
FIG. 7 diagrammatically illustrates a particular procedure used in the last mentioned method.
Figure 6:
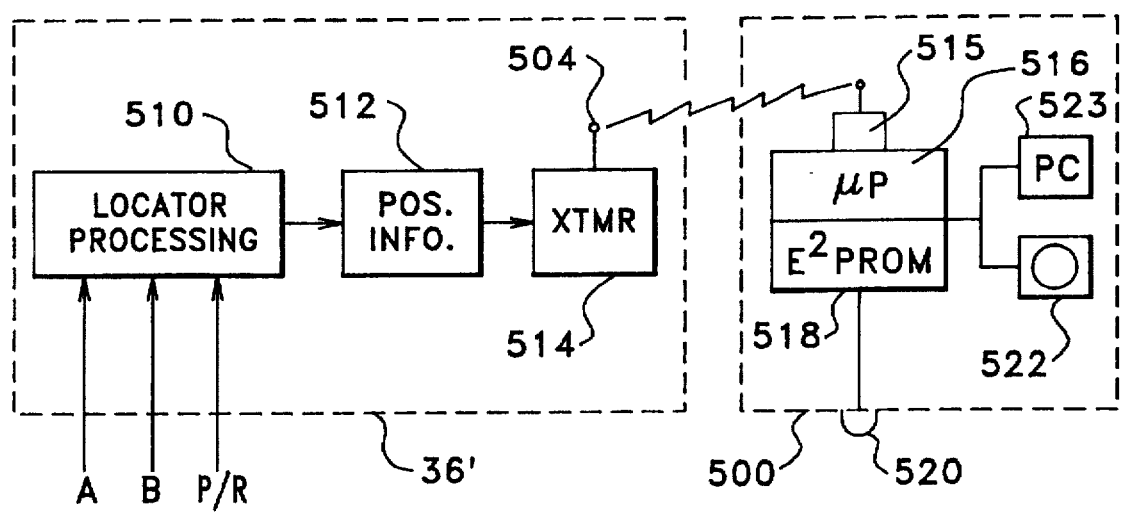
FIG. 6 diagrammatically illustrates an overall arrangement which is designed in accordance with the present invention and which utilizes much of the technology of the Mercer Patents and the remote processing system generally shown in FIG. 4 and designed in accordance with the present invention to carry out a method of establishing and recording the actual path taken by the boring tool, as shown in FIG. 5.

Turning now to FIGS. 5–7, attention is directed to the way in which locator 36' is used by operator 26 in cooperation with remote processing system 500 and boring machine 24 which is used by operator 20 in order to establish and record the actual path taken by boring tool 28 as it moves from its starting point, for example starting pit 22, to its target point, for example termination pit 34. FIG. 5 diagrammatically depicts the starting point ST, the termination or target point T, the actual path taken by the boring tool, which path is indicated at AP and a reference path RP, all of which are located within a given region 506. For purposes of clarity, region 506 is set within a Cartesian coordinate system where the x-axis extends horizontally in the general direction of forward movement of the boring tool, where the y-axis represents the horizontal, general lateral direction with respect to the boring tool and where the z-axis represents vertical depth. For purposes of the present discussion, it will be assumed that the boring tool 28 is caused to move along path AP by operator 20 who momentarily stops the boring tool at various spaced apart measuring locations which are indicated at 508 in FIG. 5. These measuring locations may be provided at regular spaced intervals or irregularly spaced intervals and the distance between measuring locations may vary. In one embodiment, the distance between each measuring location is one drill rod making up drill pipe 10, which drill rod is approximately 10 feet. Suitable and readily providable means may be used to actually measure the amount of drill pipe in the ground and report the amount to system 500, as indicated by arrow 501 in FIG. 4. As will become apparent hereinafter, by spacing measuring locations close to one another, the actual path AP taken by the boring tool can be accurately established and recorded. Reference path RP extends along the surface of the ground and can be the ground level component of the intended path taken by the boring tool or it can be a laterally spaced ground level component, as illustrated in FIG. 5. In either case, it must be established either prior to the actual boring operation or as the boring operation proceeds, as will become apparent.

Figure 1:
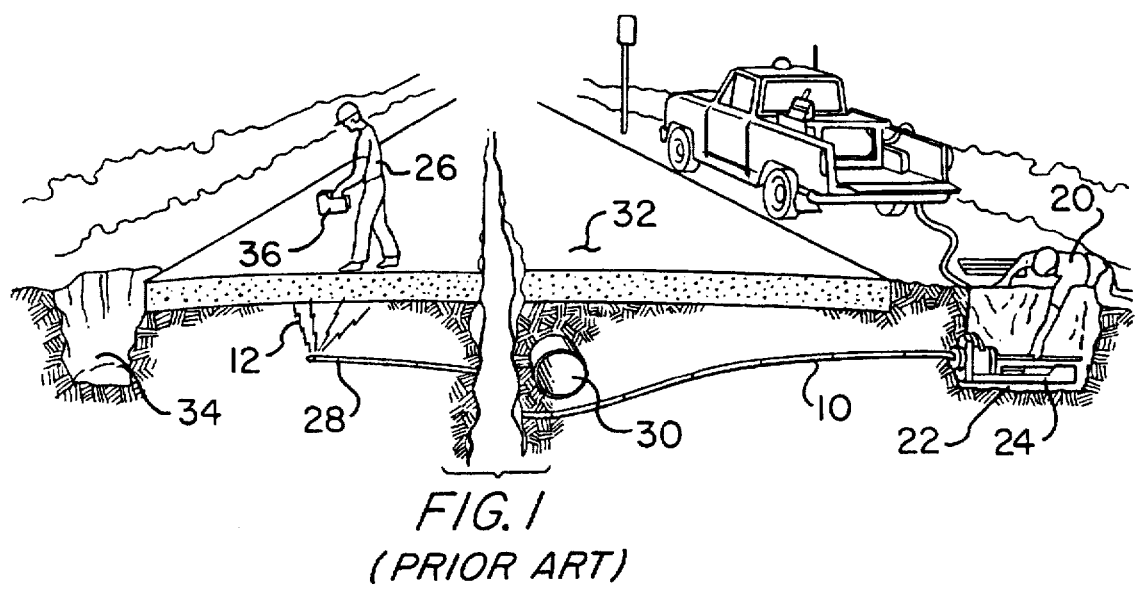
FIG. 1 is a partially broken away elevational and perspective view of a boring operation described in the previously recited Mercer Patents.

With the foregoing in mind, attention is now directed to the way in which the boring operation proceeds. At the start, operator 20 drives the drill pipe 10 out of machine 24 which, in turn, pushes drill head in front of it. At the same time, the boring tool is guided by operator 20 in the intended direction. In order for the boring tool to be guided in this way, operator 26 follows it with locator 36'. As this operator does so, the locator 36' and boring tool 28 cooperate with one another to generate certain information about the position of the boring tool relative to the position of the locator. Two specific components of this positional information are the intensities of electromagnetic field 12 at the locator as measured by antennae 122 and 124. The measuring information may also include the pitch and roll positions of the boring tool which are measured directly by sensors on the boring tool and transmitted by means of radio wave from the boring tool to the locator. In the case of the Mercer Patents, this information is processed by locator 36 and operator 26 using this processed information conveys it verbally to operator 20 who uses it for guiding the boring tool. In the case of the present invention, while locator 36' processes the information in the same manner as locator 36, the processed information is relayed from locator 36' to remote processing system 500 for further processing by the latter, as previously mentioned in conjunction with FIG. 4. The way in which locator 36 processes this information in order to determine the position of the boring tool at any given point in time is described in the Mercer Patents and reference is made thereto. This is the case whether the locator is directly over the boring tool as illustrated in FIG. 1 or laterally to one side of the boring tool as will be seen hereinafter in the case of the present invention.

As boring tool 28 is moved along its actual path AP, the positional information described immediately above is continuously generated and processed so that the boring tool may be appropriately guided. However, heretofore this information has not necessarily been recorded in any permanent form. In the case of the present invention, as will be seen, it is recorded intermittently, specifically at spaced apart measuring locations 508, and in accordance with a specific, consistent procedure while the boring tool is at a momentary standstill at each such measuring location, as will be described immediately below in conjunction with FIG. 7.

Figure 8A:
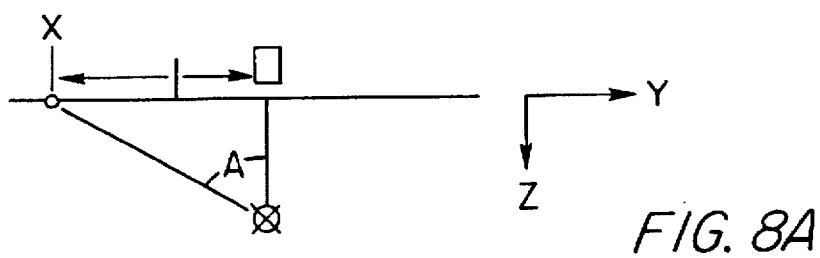
FIGS. 8A, 8B, & 8C diagrammatically illustrate the way in which the locator of FIG. 3 is used to determine the position of the boring tool of FIG. 1 when the boring tool is at any given measuring location on its path of movement shown in FIG. 5 while the locator is positioned at a corresponding reference point on the reference path which is shown in FIG. 5.
Figure 8B:
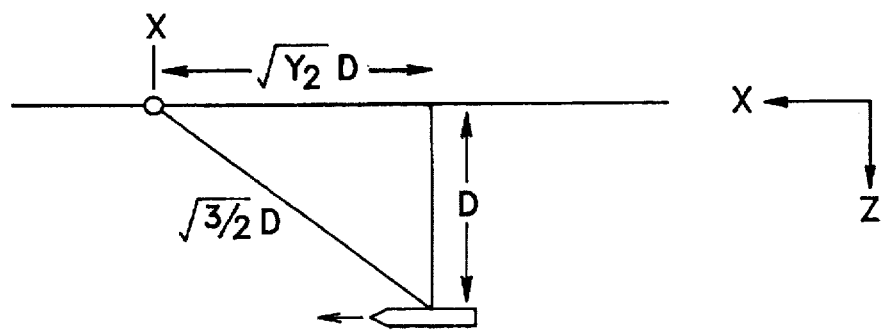

Turning to FIG. 7, the boring tool 28 is shown momentarily stopped at its first measuring location 508. With the boring tool in this stationary position, operator 26 uses locator 36' to locate one or both locate points FLP and RLP in the manner described in the Mercer Patents. In this regard, if as in the present case this is the first measurement and the operator is not sure of the direction of the boring tool, i.e. its yaw direction, he or she might wish to measure both the front locate point FLP and the rear locate point RLP in order to establish the axis of the boring tool, which axis extends through the two locate points. In subsequent measurements, if the operator knows the yaw direction of the stationary boring tool, it may be only necessary to measure one of the locate points, for example the front locate point, in order to establish the boring tool's directional axis. As stated previously, the locate points, either the front locate point or the rear locate point, is established when the vertical component of the electromagnetic field 12 bisects antennae 122, 124 when the antennae am above the locate point and, in the case of region 506, in the x, z plane as illustrated in FIG. 8b. Once the operator finds the appropriate locate point, either facing towards or away from the boring tool, the rest of the procedure would be the same one for each measurement. Should the operator select for example the front locate point, he or she then rotates the locator 90° either to the right or to the left but consistently, for example to the right if the operator is facing away form the boring tool at the front locate point in case of FIG. 5, and then, while maintaining the locator at the same elevation relative to the ground (assuming the ground is flat), the operator walks in a direction perpendicular to the directional axis of the boring tool to the reference path RP, thereby establishing a reference point 508R which is associated with the first stationary measuring location 508. With the locator in this position, the antennae 122, 124 are now generally in the y, z plane, as illustrated in FIG. 8A. In this latter regard, for purposes of discussion and a frame of reference within the x,y,z coordinate system, it is being assumed that the direction of movement of the boring tool is in the x axis. This is obviously not always the case, as illustrated, for example, FIG. 5. However, in order to understand and appreciate the present invention, that will be assumed at least with regard to the discussion of FIGS. 8A, 8B, and 8C. The data processing can easily compensate for variations in the actual direction of movement.

Once the locator is at its reference point 508R corresponding with the stationary measuring location 508 of the boring tool, operator 26 lets operator 20 know, at which time operator 20 manually actuates the remote processing system 500 so that the positional information transmitted thereto from the locator, as described in conjunction with FIGS. 4 is recorded and further processed in a manner to be described hereinafter. This procedure is repeated from one location 508 to the next with the operator most preferably following the same procedure each time, that is, first finding the same locate point, faring in the same direction at the locate point and then turning 90° from the directional axis of the boring tool from that locate point, consistently either to the left or to the right, and finally either moving forward or backward to the reference path to establish a corresponding reference point 508R.

As indicated previously, with the boring tool stationary at a location 508 and with the locator 36' at a corresponding reference point 508R, the two cooperate with one another so as to generate certain information about the position of the boring tool relative to the position of the locator. In other words, means are provided partially at and forming part of the boring tool and partially at and forming part of the locator for generating this latter information. In the case of the Mercer Patents, the boring tool itself includes means for emitting the previously described dipole field 12 and it also includes a pitch sensor and a roll sensor. At the same time, locator 36 and locator 36' each includes previously described antennae 122 and 124 and associated processing components for generating the following information components:

(1) the intensity of field 12 as measured by antenna 122 (referred to hereinafter as intensity A);

(2) the intensity of field 12 as measured by antenna 124 25 (hereinafter referred to as intensity B);

(3) the calibrated values for A and B;

(4) the signal ratio which is the value of one of the antennae measurements, for example measurement A, divided by the sum of A and B; and (5) pitch.

Calibrated A and B can be accomplished in a conventional manner by initially placing the boring tool 28 on the ground and placing the locator a known distance from it and thereafter measuring A, B intensity components and making sure that readings are adjusted to read the appropriate distances. In addition, the distance from the ground to the locator can be compensated for as described in the Mercer Patents. All of this information is readily available in the system described in the Mercer Patent.

Figure 8C:
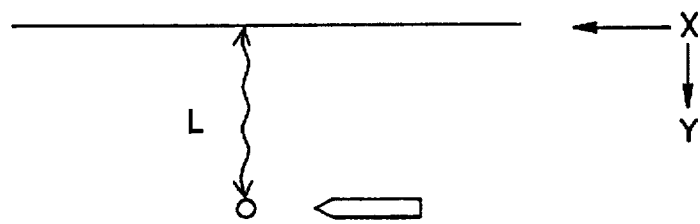

Referring specifically to FIGS. 8A, 8B and 8C, with this information, the depth D of the locator (FIG. 8B), the distance L between the negative locate point used and the associated reference point 508R (FIG. 8A and FIG. 8C) and the angle A (FIG. 8A) is determined by locator 36' (as it can with locator 36). Therefore, at each and every reference point 508R, the locator 36' can generate information providing the position of the boring tool at its corresponding measuring location 508 and this information can be stored at or in the locator or transmitted wirelessly from the locator to the remote processing system 500 which, in turn, can record the information. As will be seen below in conjunction with FIG. 6, system 500 can then display overall path AP (based on this positional information) along with the reference path RP and it can permanently record it. In this regard, it is to be understood that system 500, which will be described hereinafter, can be duplicated at the locator itself, in part or in toto, or replace the remote system, again in part or in toto. Obviously, a local system 500 would not require wireless receiving means. Some or all of the local system can be formed as an integral part of the locator or it can be designed to plug into the locator as an add-on. One example of a plug-in component might be a lap top computer which provides the same portability as the locator itself.

The discussion immediately above assumes a perfectly horizontally boring tool. Processing circuitry within locator 36' and/or system 500 can be readily provided with appropriate algorithms to compensate for pitch in the boring tool, particularly since pitch is being directly measured and provided to the locator. Thus, for example, if the boring tool is angled downward 10° from its position shown in FIG. 8B, it should be clear that the front and rear locate points would be different. Since the processing circuitry in the locator or system 500 knows this from the actual measurement of the boring tool's pitch, it can compensate accordingly.

Turning now to FIG. 6, attention is directed to the processing components contained by and forming part of locator 36' and required to interconnect locator 36' with remote processing system 500 in order to carry out the method described above. These processing components (which correspond to the processing circuitry of locator 36 as illustrated in FIGS. 5A and 5B in the Mercer patents) include locator processing means 510 including antennae 122 and 124 for detecting field 12 and antenna 126 for receiving the pitch and roll information (although a separate antenna need not be provided for this purpose). This information is processed so as to provide the locator operator 26 with the appropriate positional information which can be read out by means of readout component 512 at the locator itself. This positional information is transmitted by telemetry transmitter 514 by means of radio wave to a telemetry receiver 515 and thereafter to microprocessor 516 which stores the information selectively in, for example, an EEPROM 518. EEPROM 518 could also form part of a local system 500 as discussed above and, hence could be port of the locator itself or readily pluged into the locator. As indicated previously, only positional information that is provided during the measurement periods described previously are stored. Thus, in the case of processing system 500, either the remote system as shown or the local system discussed above, the system includes an actuatable button 520 or other suitable means that operator 20 can actuate in order to insure that the next incoming positional information will be recorded. Operator 26 lets operator 20 know when to actuate button 520. The microprocessor then can take all of the recorded information and generate a graph on display 522 and or it can input the information to a personal computer 523 which, in turn, can provide a permanent graphic record which can be printed out. In this regard, if the drill pipe 10 is measured as it is let out into the ground, that information can be fed to the microprocessor and used in conjunction with the other positional information to generate the graph.

The boring technique described above can be readily carried out by one with ordinary skill in the art by modifying locator 36 in a way which results in locator 36' and by following the procedures described herein. The modification of locator 36 resulting in 36' is readily providable in view of the Mercer patents and the disclosure herein. Once, the boring tool 28 is guided from its starting pit, for example pit 22, to its ending or target pit, for example pit 34, the appropriate utility cable or any cable for that matter can be connected to the forward end of the drill pipe, with or without the boring tool attached thereto, and the drill pipe can be pulled back through the bored tunnel to the staring pit, pulling the cable with it. At the same time, it is to be understood that the present boring technique can be used to establish and record the path of the boring tool for reasons other than installing cable. For example, it may be desirable to record the path of an exploratory drilling operation.

In addition to the foregoing, it is to be understood that the present invention is not limited to the particularly described procedure for establishing path AP. Other procedures could be set up based on the teachings herein. For example, the procedure described calls for the operator walking between the various locate points and the reference path RP. Based on the teachings herein, another procedure could be established, for example, where operator 26 continuously walks on the reference path RP and as he or she does so the locator itself could be appropriately manipulated based on balance points and signal strength ratios in antennae 122, 124 in order to establish the actual path AP.

What is claimed is:

1. In an overall process in which a boring tool is moved through the ground within a given region along a particular path from a specific starting point, a method of establishing the location of at least a portion of said particular path within the given region, said method comprising the steps of:

(a) establishing a reference path within the region;

(b) providing a portable locator and information generating means for generating certain information about the position of the boring tool relative to the position of the locator, said information generating means being located partially at and forming part of said boring tool and partially at and forming part of said locator, said information generating means including means for transmitting an electromagnetic signal from the boring tool and means including less than five spaced-apart sensors at said locator for sensing said electromagnetic signal;

(c) when said boring tool reaches various spaced-apart measuring locations as it moves along the particular path, at each such measuring location positioning the locator on the reference path at an associated reference point which is specifically determined by the position of the boring tool at the associated measuring location on the particular path;

(d) with the locator positioned at each of said reference points, generating and recording the positional information of the boring tool at the associated measuring location on the particular path; and (e) from the recorded information of the boring tool at the various associated measuring locations on the particular path, either as it is obtained or thereafter, establishing an actual path containing the associated locations, which actual path corresponds generally to at least a portion of the particular path taken by the boring tool.

2. A method according to claim 1 including the step of graphically representing the actual path.

3. A method according to claim 2 including the step of graphically representing said given region including said reference path along with said actual path.

4. A method according to claim 1 including the steps of:

(a) taking measurements of the actual distance the boring tool moves through the ground along the particular path from said starting point to each of said spaced-apart locations; and (b) using said measurements along with said recorded information to establish said actual path.

5. A method according to claim 1 wherein said information generating means also generates information about the pitch of said boring tool and wherein said pitch information is used along with said recorded information to establish said actual path.

6. A method according to claim 1 wherein said information generating means continuously generates said certain information about the position of the boring tool relative to the position of the locator as the boring tool moves along the particular path and wherein said positional information is recorded only when the boring tool is at said various spaced-apart locations.

7. A method according to claim 1 wherein when said boring tool reaches the various spaced-apart measuring locations on its particular path of movement, identical procedures are used to find the associated reference points on said reference path.

8. A method according to claim 7 wherein said information generating means includes an elongated electromagnetic radiation transmitter contained by said boring tool serving as said transmitting means, wherein information generated by said information generating means includes information about the front and rear negative locate points co-linear with the axis of the transmitter contained by the boring tool and wherein said identical procedure used to find the reference points associated with the various spaced-apart locations includes the steps of:

(a) first placing the locator in a fixed orientation at either the front or rear negative locate point when it is at each spaced-apart location; and (b) thereafter moving the locator in a predetermined way from the associated location to the reference point.

9. A method according to claim 8 wherein said information generating means includes a pair of orthogonal antennae contained by said locator for detecting the electromagnetic radiation transmitted by said transmitter and serving as said sensing means, wherein the locator is first placed in said fixed orientation at the front or rear negative locate point such that said orthogonal antennae face in a particular direction and are in a particular horizontal plane, and wherein the predetermined way in which the locator is moved from each location to its associated reference point is to move it from the location to the reference path in a direction perpendicular to a line though the negative locate points of the boring tool while rotating the locator about a vertical axis such that when the locator reaches the particular reference point the orthogonal antennae are rotated 90° about the vertical axis and they are in the same horizontal plane.

10. In an overall process in which a boring tool is moved through the ground within a given region along a particular path from a specific starting point, a method of establishing the location of said particular path within the given region, said method comprising the steps of:

(a) establishing a reference path within the region;

(b) providing a portable locator and information generating means for continuously generating certain information about the position and pitch of the boring tool relative to the position of the locator as the boring tool moves through the ground along the particular path and for generating information about the front and rear negative locate points co-linear with the axis of a transmitter contained by the boring tool, said information generating means being located partially at and forming part of said boring tool and partially at and forming part of said locator, said information generating means including (i) a pitch sensor, (ii) said elongated electromagnetic radiation transmitter contained by said boring tool, and (iii) a pair of orthogonal antennae contained by said locator for detecting the electromagnetic radiation transmitted by said transmitter;

(c) taking measurements of the actual distance the boring tool moves through the ground along the particular path from said starting point to each of said spaced-apart locations;

(d) when said boring tool reaches various spaced-apart measuring locations as it moves along the particular path, at each such measuring location, using the same procedure for each measuring location, positioning the locator on the reference path at an associated reference point which is specifically determined by the position of the boring tool at the associated measuring location on the particular path, said procedure being used to find the reference points associated with the various spaced-apart locations including the steps of
  (i) first placing the locator in a fixed orientation at either the front or rear negative locate point when it is at each spaced-apart location,
  (ii) thereafter moving the locator in a predetermined way from the associated location to the reference point;
(e) with the locator positioned at each of said reference points, recording the positional information and pitch of the boring tool at the associated location on the particular path;
(f) from the recorded positional information and pitch of the boring tool at the various associated measuring locations on the particular path and from the measurements of the actual distance the boring tool moves through the ground along the particular path from said starting point to each of said spaced-apart locations, either as the positional information is recorded or thereafter, establishing an actual path containing the associated locations, which actual path corresponds generally to the particular path taken by the boring tool; and
(g) graphically representing said given region including said reference path along said actual path.

11. A method according to claim 10 wherein the locator is first placed in said fixed orientation at the front or rear negative locate point such that said orthogonal antennae face in a particular direction and are in a particular horizontal plane, and wherein the predetermined way in which the locator is moved from each location to its associated reference point is to move it from the location to the reference path in a direction perpendicular to a line though the negative locate points of the boring tool while rotating the locator about a vertical axis such that when the locator reaches the particular reference point the orthogonal antennae are rotated 90° about the vertical axis and they are in the same horizontal plane.

12. A method according to claim 10 wherein said positional information and pitch of said boring tool is recorded only when the boring tool is at said various spaced-apart locations.

13. A method according to claim 12 wherein said information generating means is also located partially at a remote location, said information generating means including means for sending said positional information and pitch of said boring tool by wireless transmission from the locator to said remote location and wherein said given region, reference path and said actual path are graphically generated at said remote location.

14. A method according to claim 13 wherein said given region, reference path and said actual path are graphically generated on a permanent medium.

15. A method according to claim 13 wherein said given region, reference path and said actual path are graphically generated on a visual monitor.

16. A method according to claim 10 wherein said boring tool produces an underground tunnel coextensive with said actual path as the boring tool moves through the ground, said method including the step of installing a cable in the ground within said tunnel.

17. A method according to claim 1 wherein said sensing means includes only two of said sensors.

18. A method according to claim 17 wherein said two sensors are positioned adjacent to and orthogonal with one another.

19. A method according to claim 9 wherein said orthogonal antennae are the only sensors forming part of said sensing means.

* * * * *